US012668075B2

(12) United States Patent
Robles Flores et al.

(10) Patent No.: US 12,668,075 B2
(45) Date of Patent: Jun. 30, 2026

(54) APPARATUS AND METHOD FOR DEPOSTING AN OVERCOAT ON AN IMAGE ON A SUBSTRATE

(71) Applicant: Xerox Corporation, Norwalk, CT (US)

(72) Inventors: Eliud Robles Flores, Rochester, NY (US); Charles Facchini, Webster, NY (US); Pedro Pagan, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 77 days.

(21) Appl. No.: 17/839,952

(22) Filed: Jun. 14, 2022

(65) Prior Publication Data

US 2022/0305833 A1 Sep. 29, 2022

Related U.S. Application Data

(62) Division of application No. 16/400,496, filed on May 1, 2019, now Pat. No. 11,383,545.

(51) Int. Cl.
*B41M 7/00* (2006.01)
*B41J 11/00* (2006.01)
(Continued)

(52) U.S. Cl.
CPC ........ *B41M 7/0036* (2013.01); *B41J 11/0021* (2021.01); *B41M 5/0011* (2013.01);
(Continued)

(58) Field of Classification Search
CPC .. B41M 7/0036; B41M 7/009; B41M 7/0081; B41M 7/02; B41M 5/0011;
(Continued)

(56) References Cited

U.S. PATENT DOCUMENTS 4,535,548 A * 8/1985 Hyde ...................... F26B 3/283 34/267
5,190,790 A * 3/1993 Blankemeyer ........... B05D 5/00 427/466
(Continued)

OTHER PUBLICATIONS

Embossing Powder Made at Home, http://www.observationsblog.com/sciencetechnologyexperiments/embossing-powder-made-at-home, Update May 9, 2015. Last accessed Dec. 13, 2018.
(Continued)

*Primary Examiner* — Brian K Talbot
(74) *Attorney, Agent, or Firm* — Simpson & Simpson, PLLC

(57) ABSTRACT

A system and method for applying an overcoat to a printed image on a substrate generally includes a radiative source that transmits electromagnetic radiation within a predefined wavelength range to the printed image on the substrate to be absorbed by the printed image and heat the printed image to a predetermined temperature range, a depositing device that deposits an overcoating powder onto the heated printed image, the overcoating powder having a melting point within the predetermined range such that upon deposition thereof, the overcoating powder adheres and/or melts onto the heated printed image, and a residual powder removing device that removes any residual overcoating powder not adhered to the printed image or the substrate.

20 Claims, 8 Drawing Sheets

(51) Int. Cl.

| | |
|---|---|
| ***B41M 5/00*** | (2006.01) |
| ***B41M 7/02*** | (2006.01) |
| *B05D 1/06* | (2006.01) |
| *B05D 1/12* | (2006.01) |
| *B05D 3/00* | (2006.01) |
| *B05D 3/02* | (2006.01) |
| *B05D 3/06* | (2006.01) |
| *B05D 7/00* | (2006.01) |

(52) U.S. Cl.
CPC .......... *B41M 7/0081* (2013.01); *B41M 7/009* (2013.01); *B41M 7/02* (2013.01); *B05D 1/06* (2013.01); *B05D 1/12* (2013.01); *B05D 3/002* (2013.01); *B05D 3/0218* (2013.01); *B05D 3/062* (2013.01); *B05D 7/52* (2013.01)

(58) Field of Classification Search
CPC .......... B41J 11/0021; B05D 1/06; B05D 1/12; B05D 3/002; B05D 3/0218; B05D 3/062; B05D 7/52
USPC .......................................................... 427/557
See application file for complete search history.

(56) References Cited

U.S. PATENT DOCUMENTS 5,338,578 A * 8/1994 Leach .................. B05D 3/0413 427/195
5,654,037 A * 8/1997 Moore ..................... B05D 7/02 427/322
6,221,441 B1 * 4/2001 Emch ....................... B05D 7/52 427/388.1
6,596,347 B2 * 7/2003 Emch ..................... B05D 7/534 427/195
6,808,584 B2 * 10/2004 Kasbauer ................ B41F 23/08 156/247
6,921,558 B2 * 7/2005 Fredericksen ........... B05D 7/02 427/195
7,037,398 B2 * 5/2006 Kwasny ............... B41M 7/0027 156/247
7,297,397 B2 * 11/2007 Leininger ............... B32B 15/08 427/508
7,531,074 B2 * 5/2009 Purdy ...................... B05D 7/16 427/407.1
7,787,816 B2 * 8/2010 Kladias .............. G03G 15/2039 399/400
8,043,665 B2 * 10/2011 Chretien .............. B41M 7/0027 427/454
8,449,102 B2 5/2013 Breton et al.
8,786,655 B2 * 7/2014 Liu .......................... B41J 2/525 347/240
9,186,916 B1 * 11/2015 Ishihara ............. B41J 11/00212
10,507,675 B2 * 12/2019 Ohnishi ............... C09D 11/322
10,532,582 B2 * 1/2020 Shields ................ B41M 5/0011
10,599,078 B2 * 3/2020 Ota .................... B41J 11/00212
11,027,560 B2 * 6/2021 Shields ................ B41M 5/0047
2003/0108689 A1 * 6/2003 Tan ...................... C09D 11/101 428/29
2003/0113476 A1 * 6/2003 Fredericksen ........... B05D 7/02 427/314
2003/0211252 A1 * 11/2003 Daniels .................... B05D 7/06 118/308
2006/0153989 A1 * 7/2006 Horsnell .............. B41J 11/0015 427/401
2007/0224438 A1 * 9/2007 Van Benthem ...... B05D 3/0263 427/595
2010/0112232 A1 * 5/2010 Chretien .............. B05D 3/0209 427/493
2010/0266782 A1 * 10/2010 Langlois .................. B05D 1/12 427/195
2011/0036255 A1 2/2011 Monclus et al.
2012/0270055 A1 * 10/2012 Sheng ..................... C04B 41/52 347/102
2013/0076844 A1 3/2013 Tombs et al.
2016/0368055 A1 12/2016 Swaminathan et al.
2017/0298240 A1 * 10/2017 Ramirez ................ C09D 11/36
2019/0322881 A1 10/2019 Chopra et al.
2020/0180328 A1 6/2020 Jackson et al.
2020/0247141 A1 * 8/2020 Shields ................ B41J 11/0021
2020/0346403 A1 11/2020 Veis et al.

OTHER PUBLICATIONS

Basic Heat Embossing, http://www.stampin.com/tips/htemb.htm, last accessed Apr. 30, 2019.
Detail Embossing Powder, https://www.michaels.com/detail-embossing-powder-by-recollections-signature/M10263090.html, last accessed Apr. 30, 2019.

* cited by examiner

APPARATUS AND METHOD FOR DEPOSTING AN OVERCOAT ON AN IMAGE ON A SUBSTRATE

CROSS REFERENCE TO RELATED APPLICATIONS

This application is a Divisional of U.S. patent application Ser. No. 16/400,496, filed May 1, 2019, now U.S. Pat. No. 11,383,545, which is incorporated herein by reference in its entirety.

TECHNICAL FIELD

The present disclosure is directed to a system and method for applying an overcoat, such as a clear, glossy, colored, or raised overcoat to an image on a substrate.

BACKGROUND

Printing processes capable of producing clear, glossy, colored, or raised overcoats on stock such as business cards, greeting cards, invitations, and the like are generally known. Such processes currently range from simple manual crafting-type processes to more complex high-throughput processes that require the use of highly specialized and expensive printing machines. While there are many ways to produce the various overcoats, in the typical manual-type process a wet ink is first applied to the stock or substrate using an appropriate implement (e.g., a brush), an overcoating powder is then deposited upon the wet ink to adhere thereto, the excess powder is removed, and then a source of heat, such as from a heat gun, is applied to melt the adhered powder to form the desired overcoat. In the case of more complex high-throughput processes utilizing highly specialized printing machines, the basic processes to form the desired overcoats can be generally the same as the manual processes, but are different in that they are performed using the highly specialized printers, equipment and/or specialized ink/toner compounds. For example, some current high-throughput processes utilize specialized thermographic equipment including addressable printheads to first deposit a wet ink on a desired position on a substrate, in an immediate subsequent depositing step, a dry UV curable powder is then applied to the wet ink so as to adhere the powder thereto, a process is applied to remove any of the residual powder not adhering to the wet ink, and UV light then applied to cure the powder in order to produce the overcoat. While the high-throughput processes are, on their most basic levels, generally the same as the simple processes, they are viewed as being very expensive due to the need to utilize highly specialized and dedicated printing equipment and/or specialized powders.

In addition to the high costs associated with current high-throughput equipment and processes, due to fact that powders must be immediately deposited after a wet ink is applied and the powder cured shortly thereafter, the use of wet inks inherently limits overall throughput and the manufacturing process in general. That is, once the wet ink is applied to the stock or substrate, the powder must be immediately applied while the ink remains tacky or wet, i.e., the substrate including the wet ink cannot be set aside for later processing.

Furthermore, while other approaches for applying overcoats are known, which can apply coatings before or after other inks have been applied to the stock or substrates, such printers and processes typically utilize front-end scanning devices to first obtain image information pertaining to a document or image that is to be reproduced. Thereafter, the specific locations at which the overcoats are to be applied are identified, and the overcoats applied to the reproduced document using specialized printers having addressable heads for depositing overcoats at the desired locations. An example of such type of system is described in U.S. Pat. No. 7,212,772, which describes an electrophotographic printer and processes configured to print a three-dimensional texture on a reproduced document by applying toner in locations corresponding to where the texture is desired.

As may be appreciated from the above, current processes for producing overcoats typically utilize one or more of wet inks, require front-end scanning devices for obtaining image data, and/or utilize specialized equipment, e.g. addressable printheads, for applying overcoats to specific regions of document or image that is to be reproduced. As previously discussed, such processes and equipment can limit overall production options and/or require the use of very highly specialized and costly printing equipment.

The present disclosure, thus, describes systems and methods for depositing overcoats on stock or a substrates including an image without the need to first deposit a wet ink for purposes of adhering an overcoating powder, without the need to utilize specialized equipment to first obtain image information to determine where on the stock or substrate the overcoat is to be applied, and without the need to utilize expensive specialized printing equipment having, for example, addressable printing heads, in order to deposit the overcoats on desired regions of the stock or substrate.

SUMMARY

The subject matter of the instant disclosure generally utilizes the inherent properties of different compositions to absorb certain wavelengths of electromagnetic radiation and become heated more effectively than others in order to apply overcoats, e.g., clear, glossy, colored, or raised or textured overcoats, etc., to portions of a substrate including an image, which image may have been previously rendered or produced contemporaneously in an in-line fashion. According to the systems and methods of the instant disclosure, overcoating powders are used to apply an overcoating to the images and the need to utilize wet type inks to adhere the overcoating powders, as well as the need to utilize specialized printing equipment, may be avoided. The aforementioned opens up production options and also reduces overall costs.

It has been found that by transmitting electromagnetic radiation in predetermined wavelength ranges to a substrate including an image, e.g., a black and white xerographic image appearing on a substrate such as paper, a greeting card, or a business card, etc., certain portions of the image, e.g., black portions, will tend to absorb more of the transmitted electromagnetic radiation as compared to other portions of the image or substrate, e.g., white portions or background portions of the image or substrate. Owing to these different properties, the black portions of the image and substrate will typically exhibit increased temperature rise rates (Deg. C/Sec.) that exceed that of the white portions. By utilizing the differences in the temperature rise rates, an expected time period at which the darker portions will reach a temperature sufficiently high to adhere and/or melt a subsequently applied overcoating powder, but not adhere and/or melt the overcoating powder to the lighter portions, can be determined. Based on such determination, as well as other factors, an overcoating powder can be applied to the substrate including the image, which powder will only adhere and/or melt upon the darker portions of the image, but not to the lighter portions. Thereafter, any residual overcoating powder not adhered to the image can be removed, recycled and/or reused leaving the substrate including an image having an overcoat. In other words, a desired overcoat can be applied to a pre-printed image in a simple manner without the need to utilize wet inks or specially curable powders, such as UV curable powders, expensive scanning equipment, or highly specialized and expensive printing equipment.

According to aspects set forth herein, there is provided a system that applies an overcoat to a printed image on a substrate. The system generally includes a radiative source that transmits electromagnetic radiation within a predefined wavelength range to the printed image on the substrate, the electromagnetic radiation being absorbed by the printed image and heating the printed image to a predetermined temperature range, a depositing device that deposits an overcoating powder onto the heated printed image, the overcoating powder having a melting point within the predetermined range such that upon deposition thereof, the overcoating powder adheres and/or melts onto the heated printed image, and a residual powder removing device that removes any residual overcoating powder not adhered to the printed image or substrate.

According to further aspects, the system the radiative source transmits the electromagnetic radiation to the printed image for a predetermined time to heat the printed image to the predetermined temperature range, and the predetermined time is based on one or more of a characteristic of the substrate, a characteristic of the printed image, a wavelength range transmitted by the radiative source, an intensity of the electromagnetic radiation transmitted by the radiative source, or a distance between the substrate and the radiative source. In some aspects, the radiative source transmits electromagnetic radiation having a wavelength from approximately 0.7 μm to 1 mm and/or a characteristic of the printed image includes one or more of a color of the printed image and/or a component of an ink or toner used to apply the image on the substrate having an increased ability to absorb electromagnetic radiation having wavelengths from 0.7 μm-1 mm. In some aspects, the component comprises an additive to the ink or toner that is configured to more effectively absorb wavelengths in the range transmitted by the radiative source.

In still yet some aspects, the radiative source transmits the electromagnetic radiation to a portion of the substrate not including the printed image for the predetermined time and the portion of the substrate not including the image is not heated to within the predetermined range. In some aspects, the printed image includes a first printed region and a second printed region and the radiation transmitted to the first and second printed regions heats the first printed region to the predetermined range, but does not heat the second printed region to the predetermined range. In some aspects, the first printed region includes a first color and the second printed region includes a second color and the first color absorbs the electromagnetic radiation transmitted by the radiative source more effectively as compared to the second color.

In some aspects, the substrate and/or the second printed region is covered by or includes a component that, as compared to the first printed region, reflects the electromagnetic radiation transmitted by the radiative source more effectively.

In some particular aspects, the radiative source transmits electromagnetic radiation having a wavelength from approximately 0.7 μm to 1 mm (e.g., wavelengths considered to be in the near-infrared, the infrared (IR), and far-infrared (IR) spectrums), and the substrate and/or the second printed region includes a reflective component, or is covered with a reflective coating, that reflects the wavelengths emitted by the radiative source.

In some aspects, the overcoating powder forms one or more of a clear, glossy, colored, or raised overcoat, and in some aspects, the overcoating powder expands in size. In some aspects, the printed image can be printed in a half-tone image such that, for example, upon application of colored powders to the image, viewing of the underlying image can be difficult, if viewed at all.

In some aspects, the radiative source comprises a full-width radiative source that extends a significant width of the substrate and primarily transmits a wavelength from approximately 0.7 μm to 1 mm. In some aspects, the radiative source is configured to primarily transmit electromagnetic radiation having wavelengths from approximately 0.7 μm-1.4 μm (i.e., near-infrared wavelengths, also known as IR-A). In some aspects, the radiative source is configured to primarily transmit electromagnetic radiation having wavelengths from approximately 1.4 μm-3 μm (i.e., short-infrared wavelengths, also known as IR-B). In some aspects, the radiative source is configured to primarily transmit electromagnetic radiation having wavelengths from approximately 3 μm-8 μm (i.e., mid infrared wavelengths, also known as IR-C). In some aspects, the radiative source is configured to primarily transmit electromagnetic radiation having wavelengths from approximately 8 μm-15 μm (i.e., long infrared wavelengths, also known as IR-C). Finally, in some aspects, the radiative source is configured to primarily transmit electromagnetic radiation having wavelengths from approximately 15 μm-1000 μm (i.e., far infrared wavelengths). In some aspects, an additional radiative source that transmits other wavelengths of electromagnetic radiation, e.g., white light, may be used in combination with the radiative source.

In some aspects, the depositing device comprises a full-width hopper device that extends a significant width of the substrate, and the residual powder removing device comprises a full-width device that extends a significant width of the substrate and includes one or more of a sweeping device (e.g., a blade or brush-type device), an air blowing device (e.g., an air knife), or a vacuum device.

In some aspects, the system is configured such that the substrate including the image is in the form of an individual sheet, which can be transported using a conveyor from the radiation source to the depositing device and to the residual powder removing device. In other aspects, the system is configured such that the substrate is in the form of a roll, and the substrate including the image is transported using a conveyor from the radiation source to the depositing device and to the residual powder removing device.

In some aspects, the system further includes a pinning assembly that, subsequent to the residual powder removing device removing the any residual overcoating powder not adhered to the printed image, pins the dry overcoating powder adhered and/or melted onto the printed image by, for example, the application of sufficient heat that causes melting of the overcoating.

In aspects applying the method of overcoating a printed image on a substrate, the method generally includes the steps of: transmitting electromagnetic radiation within a predefined wavelength range to the printed image on the substrate such that the electromagnetic radiation is absorbed by the printed image to heat the printed image to a predetermined temperature range, depositing an overcoating powder onto the heated printed image with a depositing device, the overcoating powder having a melting point within the predetermined temperature range such that upon deposition thereof, the overcoating powder adheres and/or melts onto the heated printed image; and removing any residual overcoating powder not adhered to the printed image or substrate with a residual powder removing device.

In some aspects of the method, the electromagnetic radiation is transmitted to the printed image on the substrate for a predetermined time to heat the printed image to the predetermined temperature range, the predetermined time based on one or more of a characteristic of the substrate, a characteristic of the printed image, a wavelength range transmitted by the radiative source, an intensity of the electromagnetic radiation transmitted by the radiative source, or a distance between the substrate and the radiative source.

In some aspects of the method, the transmitted electromagnetic radiation has a wavelength from approximately 0.7 μm to 1 mm. In some aspects, the radiative source transmits the electromagnetic radiation to a portion of the substrate not including the printed image for the predetermined time, the portion of the substrate not including the image not being heated to within the predetermined range. In some aspects, an additional radiative source that transmits other wavelengths of electromagnetic radiation, e.g. white light, may be used in combination therewith.

In some aspects, in the system an method for applying an overcoat on a substrate including an image, the image and substrate can be pre-produced and subsequently coated using an independent, stand-alone machine at a point later in time, or the image and substrate can be produced and then contemporaneously overcoated in an in-line fashion using a printing machine integrating the instant disclosed system. From a productivity perspective, i.e., throughput, it can be desirable to provide an overcoating system that is independent from a printing machine as such a system can provide greater production flexibility and can provide higher uptimes than a system that is integrated with a printing machine in an in-line manner. Notwithstanding, a system according to the instant disclosure can be integrated with a printing machine in an in-line manner.

Other objects, features and advantages of one or more embodiments will be readily appreciable from the following detailed description and from the accompanying drawings and claims.

BRIEF DESCRIPTION OF THE DRAWINGS

Various embodiments are disclosed, by way of example only, with reference to the accompanying drawings in which corresponding reference symbols indicate corresponding parts, in which.

DETAILED DESCRIPTION

Figure 1:
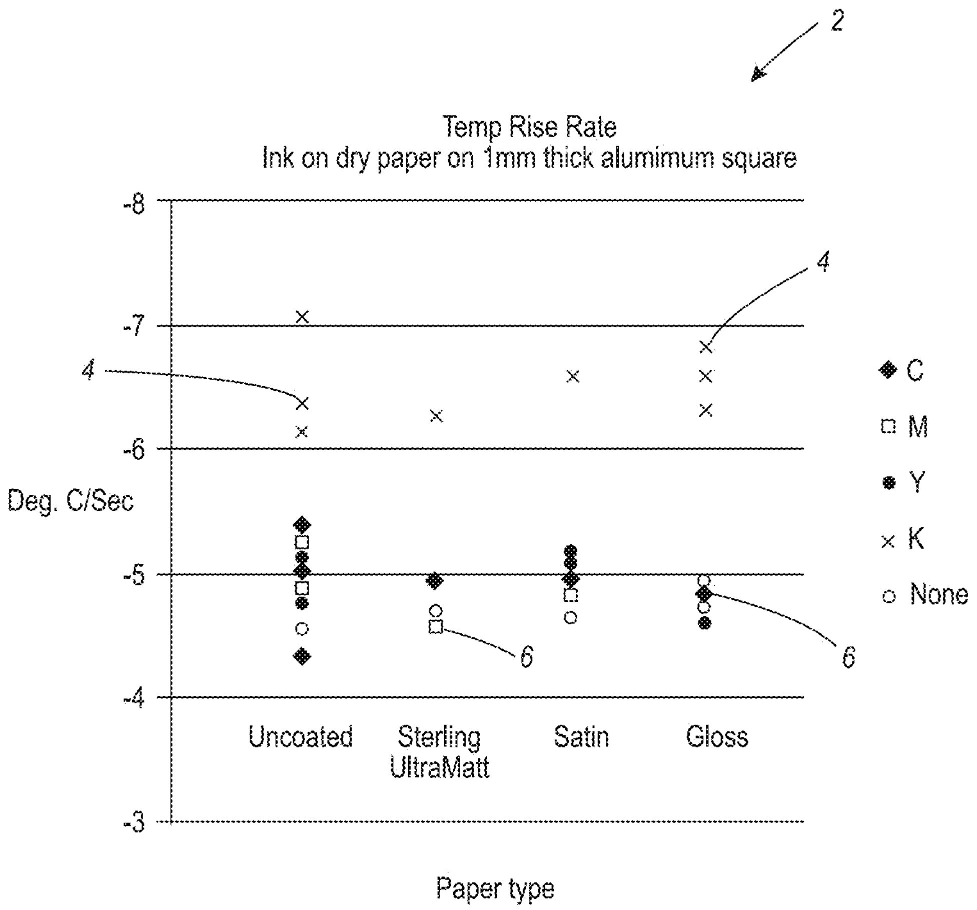
FIG. 1 is a graphical representation of Temperature Rise Rates of various colored inks (Cyan (C), Yellow (Y), Magenta (M) and Black (K)) on various substrates.

At the outset, it should be appreciated that like drawing numbers on different drawing views identify identical, or functionally similar, structural elements of the embodiments set forth herein and the drawings may be drawn to scale and/or purposefully not drawn to scale so as to emphasize certain regions, features and concepts. Furthermore, it is understood that the disclosed embodiments are not limited to the particular materials, methodologies, and modifications described and as such may, of course, vary. It is also understood that the terminology used herein is for the purpose of describing particular aspects only, and is not intended to limit the scope of the disclosed embodiments, which are limited only by the appended claims.

Unless specifically defined otherwise, all technical and scientific terms used herein have the same meaning as commonly understood to one of ordinary skill in the art to which these embodiments belong. As used herein, "full width", e.g., "full width radiative source," "full width hopper device" and/or "full width" residual powder removing device," is intended to be broadly construed as a structure that covers a significant width of a substrate. For example, in some embodiments, the length of a full width radiative source can extend the width of a substrate, or could extend approximately half of the width of the substrate.

Furthermore, the words "printer," "printer system", "printing system", "printer device" and "printing device," "printing machine," etc., and similar type words and phrases as used herein encompass an apparatus, such as a digital copier, bookmaking machine, facsimile machine, multi-function machine, etc. which performs a print outputting function for any purpose. Additionally, as used herein, "substrate", "printable substrate", and/or "web" can refer to, for example, substrates such as paper, transparencies, parchment, film, fabric, plastic, photo-finishing papers or other coated or non-coated substrate media in the form of individual sheets or rolls thereof upon which information or markings can be produced, reproduced and/or visualized. As used herein, the terms "melt," "melting," and the like, in addition to being defined according to their ordinary and customary meanings, are also intended to mean any softening, full or partial liquefaction, or other physical change that causes a substance, e.g. an overcoating powder, to be more likely to perform its desired function within the context of the instant description. As used herein, "overcoating powder" is intended to refer to a powdered, particulate, or granular thermoplastic composition having a melting point from approximately 90-150 Deg. C, and preferably from approximately 90-125 Deg. C, whose particles melt and/or fuse with one another to form a coating when heated. An "overcoating powder" can include powders or particulates for purposes of forming one or more of clear, glossy, colored, textured or raised, or expanded overcoats.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, although any methods, devices or materials similar or equivalent to those described herein can be used in the practice or testing of these embodiments, some embodiments of methods, devices, and materials are now described.

As previously set forth, it has been found that by transmitting electromagnetic radiation in predetermined wavelength ranges to a substrate including an image, e.g., a black and white xerographic image appearing on a substrate such as paper, a greeting card, or a business card, etc., certain portions of the image, e.g., black portions, will tend to absorb more of the transmitted electromagnetic radiation as compared to other portions of the image or substrate, e.g., white portions or background portions of the image or substrate.

As shown in FIG. 1, which is a graphical illustration of experimental data showing Temperature Rise Rates (Deg. C/Sec.) 2 of black inks (K) 4 versus various colored inks (Cyan (C), Yellow (Y) and Magenta (M)) 6 appearing on white paper substrates (e.g., of types commercially available from the Xerox Corporation) set on a 1 mm aluminum square and exposed to a radiative source transmitting electromagnetic radiation (e.g., a full-width infrared (IR) emitter of a type commercially available from the Heraeus Group and/or the Lichtzen Co., Ltd., capable of transmitting wavelengths in the IR spectrum, it can be seen that those portions of the white paper substrates including the black inks 4 exhibited increased temperature rise rates as compared to the colored inks (C, Y, and M) and portions of the substrate without inks 6, regardless of the type of white paper substrate utilized, i.e., Xerox uncoated, Sterling Ultramatte, Satin, and Glossy papers. For example, in the case of black and colored inks disposed on an uncoated paper substrate, the temperature rise rate differential between the black inks 4 and the colored inks 6 ranged from at least 0.5 Deg. C/Sec. in the case of Cyan (C) to approximately 3.0 Deg. C/Sec in the case of Yellow (Y). In the case of Ultra Sterling Matte, Satin, and Glossy white paper substrates, the temperature rise rate differentials ranged between approximately 1.5 Deg. C./Sec. to 2.0 Deg. C./Sec. (UltraSterling Matte), approximately 1.5 Deg. C./Sec. to 2.0 Deg. C./Sec. (Satin), and 1.2 Deg. C./Sec. to 2.0 Deg. C./Sec. (Glossy), respectively.

Figure 2A:
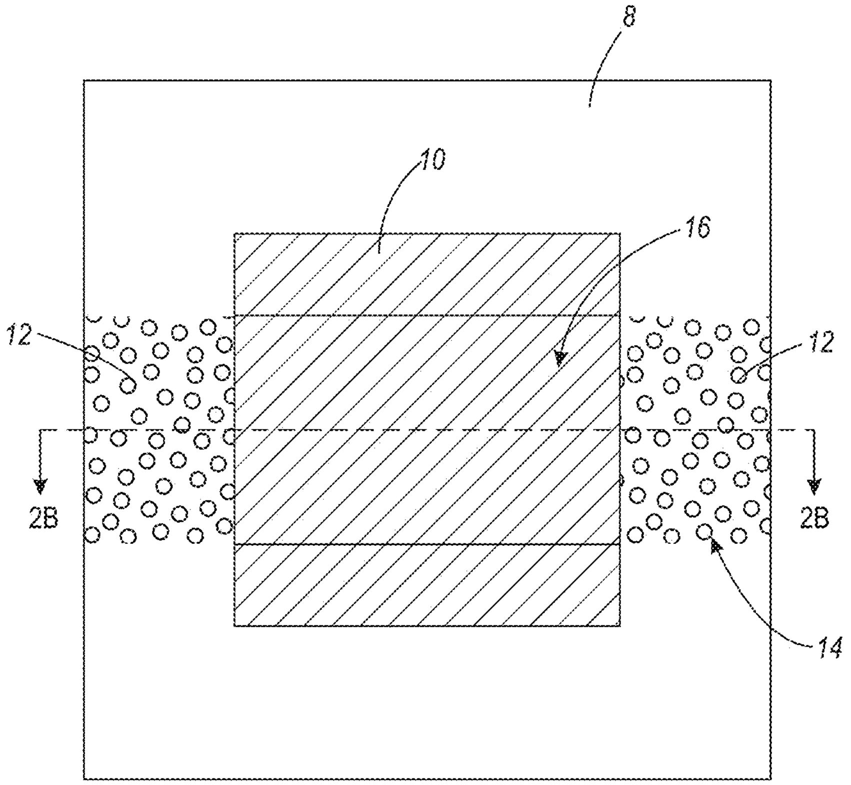
FIG. 2A-2B are illustrations of results of an experiment performed on a white paper substrate utilizing a clear overcoating powder, and a cross section thereof taken generally along line 2B-2B of FIG. 2A, respectively.
Figure 2B:
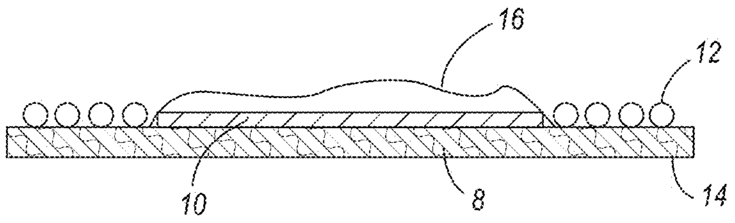

Referring now to FIGS. 2A and 2B, based on the observed differences in temperature rise rates described above, subsequent experiments were performed utilizing a white paper substrate 8 including a black (K) ink/toner image 10 and a clear overcoating powder 12 having a melting point of approximately 105-110 Deg. C. In the experiments, the substrate 8 including the image 10 was exposed to a radiative source transmitting wavelengths in the range of 0.7 μm to 1 mm, e.g., an IR transmitter, for a sufficient period of time to raise the temperature of the substrate corresponding to the image 10 to the melting point of the clear overcoating powder 12, but insufficient to similarly raise the temperature of those portions of the substrate not including the image 14. Thereafter, the clear overcoating powder 12 was applied to the substrate 8 and image 10 and allowed to cool to fix the overcoating powder 12. After cooling, residual overcoating powder not adhered to the substrate 8 and image 10 was subsequently removed. As a result of the above experiments, it was observed that the clear overcoating powder 12 adhered/melted upon those portions of the substrate 8 corresponding to the image 10 to form a clear overcoating 16 thereon, but did not similarly adhere/melt to non-image portions 14 of the substrate.

Referring now to FIGS. 3A-3F, a system that applies an overcoat to a printed image on a substrate is shown. As generally illustrated in FIGS. 3A-3F, a substrate including a preprinted ink/toner image 18, e.g., a paper sheet 20 including an image 22 printed in a black ink/toner, is shown as being conveyed via a conveyor system (not shown) from radiative assembly 24, to powder depositing assembly 40, and then onto residual powder removing assembly 50 to produce a substrate including an image and an overcoating 58.

Figure 3A:
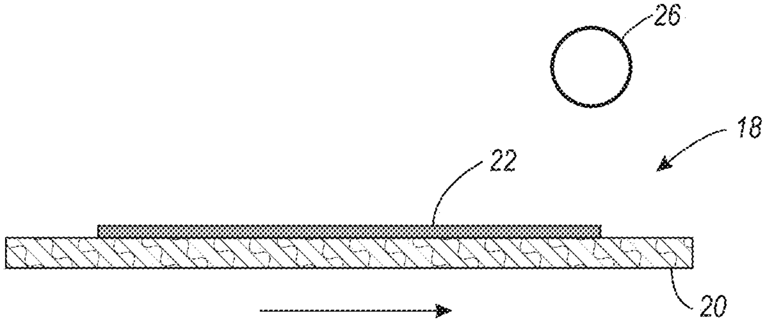
FIGS. 3A-3F are a schematic diagrams of a system for overcoating a substrate including a printed image thereon.
Figure 3B:
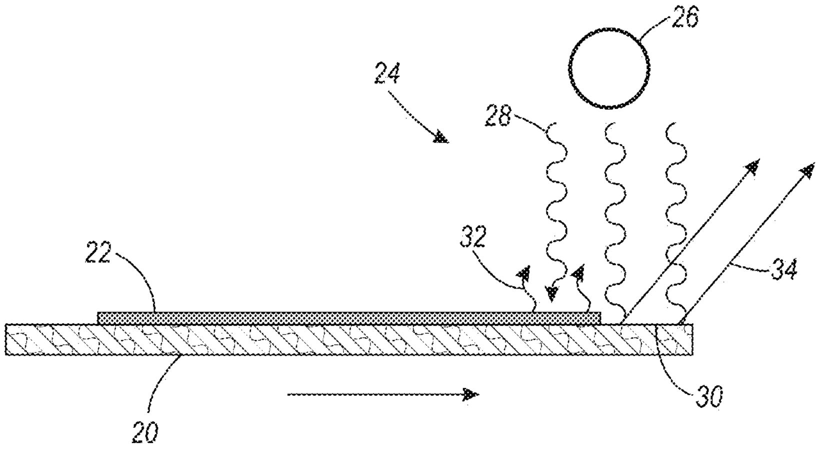

As shown in FIG. 3B, the substrate including an image 18 is generally shown as being conveyed via the conveyor (not shown) through the system in the direction shown by the arrow where it is first passed through radiative assembly 24. Radiative assembly 24 generally includes a radiative source 26 that transmits electromagnetic waves 28 toward the substrate including the image 18 where they may be differentially absorbed/reflected by the image 22 and a portion of the substrate not including the image 30. As shown in the figure, due to the differences in the absorbance/reflectance properties of the image 22 and the portions of the substrate not including the image 30, electromagnetic waves 28 transmitted to the substrate and image 18 are absorbed by the image 22 where they are transformed into heat energy 32. By contrast, electromagnetic waves 28 transmitted to those portions of the substrate not including the image 30, are substantially reflected 34 and are not similarly converted into heat energy. As previously set forth, radiative source 26 is, preferably, an IR emitting device capable of emitting electromagnetic waves from 0.7 μm to 1 mm. A suitable radiative source 26, e.g., an IR emitter capable of emitting electromagnetic waves from 0.7 μm to 1 mm may be commercially obtained from the Heraeus Group. Radiative source 26, preferably, comprises a full-width device, i.e., a device that can extend the width of the substrate, and while shown as comprising a single rod-shaped emission device, can be formed in other shapes. While radiative source 26 is shown in the figures and described as being a single IR emitting device, radiative source 26 can be composed of a plurality of IR emitting devices to form a battery of devices, and can also include non-IR radiative sources, e.g., white light emitters, in combination with an IR emitting device. Radiative source 26 may also include one or more reflective surfaces or lenses (not shown) for focusing/directing the emitted electromagnetic waves 28. For example, reflective surfaces/lenses can be disposed behind the radiative source 26 in the case of a reflective surface, or between the radiative source 26 and a substrate in the case of a lens or other optical-type device. Radiative source 26 can be disposed at distance from the substrate 18 as may be appropriate based on a number of factors including but not limited to: the type of substrate to which image 22 is applied, e.g., paper versus plastic films, etc., the type or color of ink/toner applied to the substrate to form image 22, the power of the radiative source(s), etc.

Figure 3C:
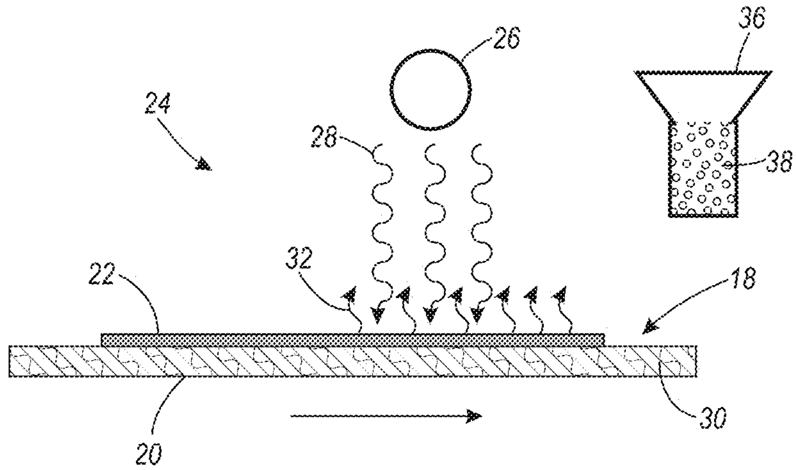

As shown in FIG. 3C, as substrate 18 is passed via the conveyor through the radiative assembly 24 in the direction shown by the arrow, electromagnetic waves 28 transmitted toward the substrate including the image 18 are absorbed by the image 22 such that the portions of the image absorbing the transmitted waves become heated 32. By contrast, portions of the substrate not including the image 30, or portions of the images that do not as effectively absorb the transmitted waves and that more effectively reflect 34 the transmitted waves 28, are not similarly heated. Portions not including the image 30 can include, for example, the substrate itself without any images, images formed of colors that do not absorb the wavelengths transmitted by the radiative source 28 as effectively and/or are more apt to reflect 34 the transmitted wavelengths, e.g., the color yellow (Y) as shown in the graph of FIG. 1, or portions of the substrate and images that may include a coating that reflects the wavelengths transmitted by the radiative source 28, e.g., an IR reflective coating. Radiative assembly 24 transmits waves 28 toward the substrate including the image 18 for an appropriate period of time in order for the image 22 to absorb sufficient electromagnetic waves, which are transformed into heat energy 32 so as to reach a melting point range of a desired powdered overcoating to be subsequently applied, but which period of time is insufficient for those portions not including the image 30 to become similarly heated. Radiative assembly 24 may include one or more sensors, e.g., a photosensor (not shown), for purposes of determining the presence and absence of an image within the assembly for purposes of initiating and ending the emission of electromagnetic waves 28 from radiative source 26. Radiative assembly 24 may include one or more temperature sensors (not shown) for purposes of determining a temperature of image 22 and/or the substrate not including the image 30.

Figure 3D:
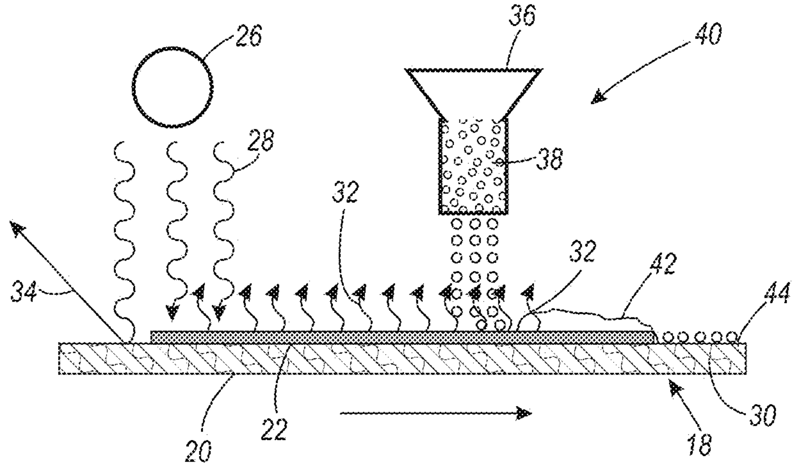

As shown in FIG. 3D, upon being heated for an appropriate period of time based on the previously described factors (e.g., temperature rise rate of image vs. substrate, melting point of overcoating powder used, etc.), the substrate 18 is then conveyed in the direction of the arrow so as to pass from the radiative assembly 24 and onto the powder depositing assembly 40. The powder depositing assembly 40 generally includes an appropriate device such as, for example, hopper 36 for dispensing an overcoating powder 38 onto the substrate including the image 18. Hopper 36, preferably, comprises a full-width device, i.e., a device that can extend the width of the substrate, and while FIG. 3D illustrates powder depositing assembly as including hopper 36, other full-width devices for depositing the overcoating powders are contemplated and may be utilized. For example, overcoating powder 38 may be blown onto the substrate under air pressure or the like. Powder depositing assembly 40 can be adjustable or disposed at a preset distance from the radiative assembly 24 and/or the substrate based on a number of factors including one or more of the type of substrate, color of an image ink/toner on the substrate, constituent components forming the ink/toner (e.g., IR absorbing additives), intensity of radiative source, temperature rise rates, etc. Powder depositing assembly 40 may also include one or more sensors, e.g., a photosensor (not shown), for purposes of determining the presence of an image and a substrate for purposes of automatically initiating and ending the deposition of the overcoating powder 38 thereon.

As may be appreciated from FIG. 3D and as previously discussed, because the portions of the substrate 18 including the image 22 have been sufficiently heated 32, but the portions not including the image 30 are not similarly heated, overcoating powder 38 deposited onto heated portions 32 adheres and/or melts and fuses upon the image 22 to form overcoat 42, whereas overcoating powder 38 deposited onto portions not including the image 30 does not adhere, melt or fuse to the substrate and remains in its powdered form as a residual powder 44.

With regard to the overcoating powder 38, such powders generally comprise a particulate or granular type composition formed primarily from thermoplastics that have what are considered to be low melting points. That is, such powders typically have a melting point range from 90-150 Deg. C, and preferably from approximately 90-125 Deg. C. In addition to exhibiting low melting points, such powders can form overcoatings that are one or more of clear, glossy, colored, textured or raised, and some can include constituent components that cause such overcoatings to expand under certain conditions. Such thermoplastic overcoating powders have physical properties similar to commercially available powders typically known as embossing powders.

Figure 3E:
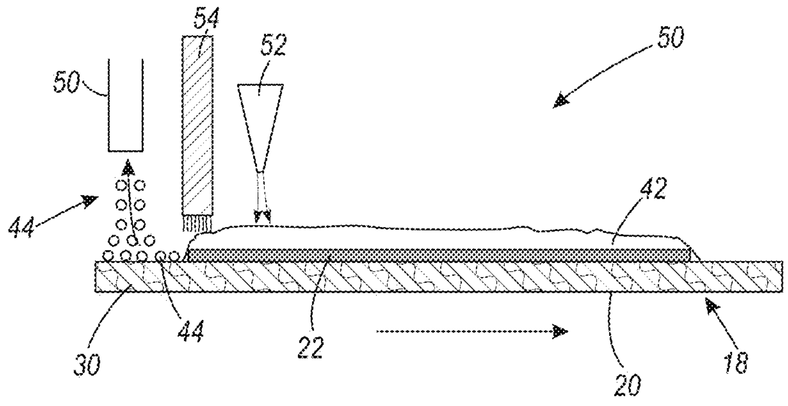

Turning now to FIG. 3E, subsequent to passing through powder depositing assembly 40, after being optionally cooled so as to sufficiently fix and cure overcoating 42 onto image 22, the substrate including the image 18 is then conveyed in the direction of the arrow to residual powder removing assembly 50 for purposes of removing any residual powder 44 not adhered to the image 22, or portions of the substrate not including the image 30. As shown in FIG. 3E, residual powder removing assembly 50 can include one or more of a blowing device 52, such as an air blade that uses forced air in a noncontact manner to direct unadhered residual powder 44 to a desired location, a sweeping device 54 including a brush or blade that manually contacts and directs the unadhered residual powder to a desired location, or a vacuum assembly 56 that removes the unadhered powder in a non-contact manner. While FIG. 3E illustrates that the substrate including the image and overcoating 42 will be first subjected to the blowing device 52, followed by the sweeping device 54, and then subsequently followed by the vacuum 56, such order is not necessarily required, e.g., residual powder can be blown with an air blade in a first step, vacuumed in a second step, and then finally swept away. However, from a perspective of ensuring that the overcoating 42 is sufficiently cured and/or avoiding possible damage to the overcoating, it is preferably to utilize non-contact means for removing residual powder 44, which can also serve to cool the overcoating before further processes requiring contact therewith are performed. While each of blowing device 52, sweeping device 54, and vacuum device 56, preferably, comprises a full-width device, i.e., a device that can extend the width of the substrate, a full-width device is not necessarily required and each may be adapted based on the particular image and overcoating to be applied.

Figure 3F:
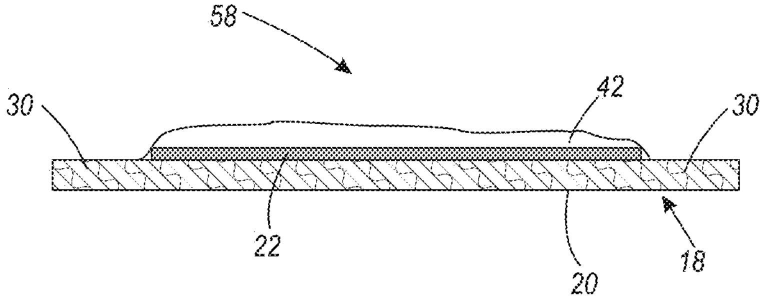

As shown in FIG. 3F, upon passing through radiative assembly 24, powder depositing assembly 40, and powder removing assembly 50, the substrate including the image and overcoating 58, which overcoating is disposed only on image 22 and, with the exception of minor edge effects, are not disposed on those portions of the substrate not including the image, is generally considered to be formed and completed. That is, while the substrate including the image and coating 58 is considered to be formed and completed, additional post processing procedures, such as passing the substrate and coated image 58 through further processes and procedures that heat the overcoating 42 may, optionally, be performed. For example, substrate including image and coating 60 could be passed onto, for example, an oven or heated rollers (not shown) to ensure adherence, or pinning, of overcoating 42, or to further enhance the appearance or gloss of the applied overcoating 42.

Figure 4:
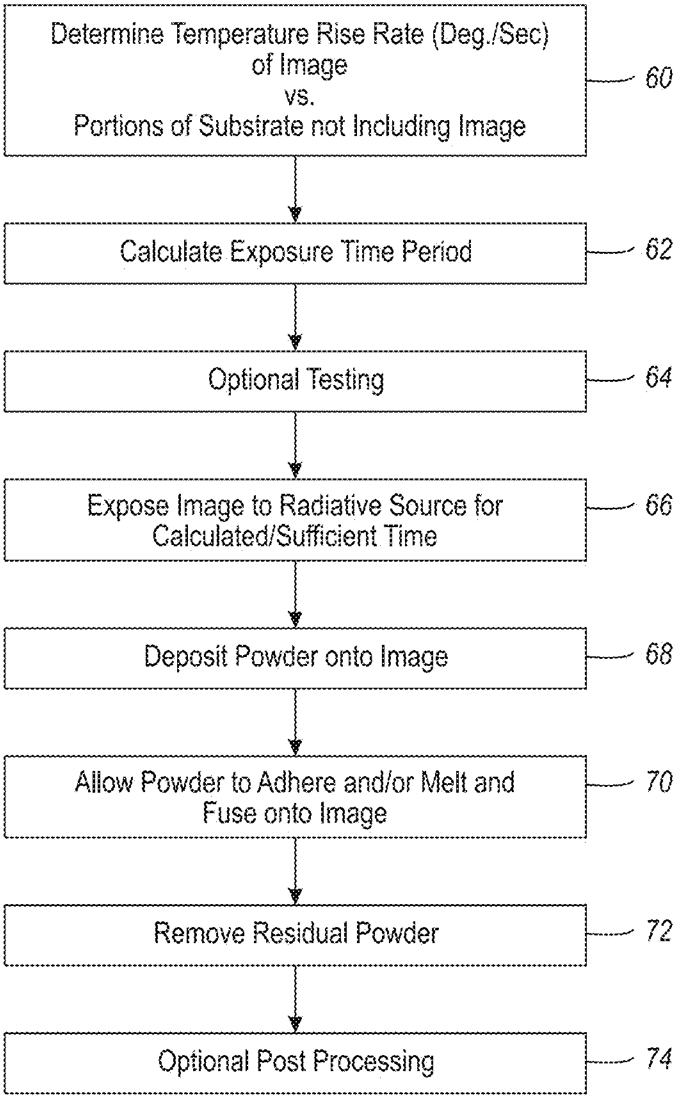
FIG. 4 is a flow chart of a method of overcoating a substrate including a printed image thereon.

Turning now to FIG. 4, which is a flow diagram illustrating the general processes and procedures for applying an overcoat to a printed image on a substrate. In step 60 a temperature rise rate of an image to be overcoated, e.g., an image applied with a black ink or of a color that more effectively absorbs electromagnetic radiation from a radiative source, such as an IR emitter, versus a temperature rise rate of the substrate or an image that is not to be overcoated, e.g., an image applied in a color tending to reflect the electromagnetic radiation from the radiative source or IR emitter, can be first determined by applying a source of electromagnetic radiation to the substrate including the image for a period of time and obtaining the temperature thereof using a thermometer, for example, an IR thermometer. Based on the determined temperature rise rates, in a second step 62, an expected time period over which the image and substrate are to be exposed to the radiative source so as to sufficiently heat the image to be overcoated, but not similarly heat those portions of the substrate not including the image, can be calculated. In an optional testing step 64, for example, where a number of identical images are to be overcoated, a sample of the substrate including the image can be exposed to the radiative source for the determined time period and actual temperature readings of the image and those portions of the substrate not including the image, obtained so as to ensure that the actual temperatures comport with the expected calculated temperatures. Where a discrepancy exists, further testing can be performed and/or modifications can be made, e.g., limiting or extending the exposure time, modifying the intensity of the radiative source, modifying distances between the radiative source and substrate, etc. to ensure that a sufficient and appropriate exposure time is applied to the image and substrate. In a third step 66, the substrate including the image can then be exposed to the source of electromagnetic radiation for the sufficient and appropriate time and/or the determined exposure time so as heat those portions of the substrate corresponding to the image to the melting point of a desired overcoating powder to be applied, but not similarly heat those portions of the substrate not including the image. Once the image to be overcoated has been sufficiently heated as described above, in a fourth step 68, the desired overcoating can be applied by depositing the overcoating powder upon the image and substrate. In step 70, the deposited overcoating powder may be allowed an appropriate amount of time to adhere and/or melt and fuse upon the image to thereby form an overcoating layer. In step 72, any residual excess powder is then removed from the image and substrate to form the substrate including the image and overcoating. Thereafter, an optional post processing step 74 can be performed to ensure adhesion of the overcoating upon the image and/or enhance the appearance of the overcoating.

Figure 5:
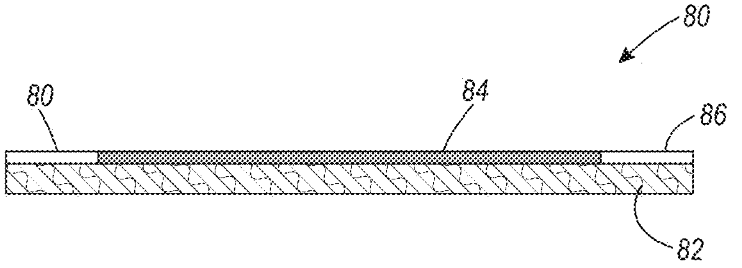
FIG. 5 is a cross-sectional illustration of an embodiment of substrate including a reflective coating applied thereto.
Figure 6:
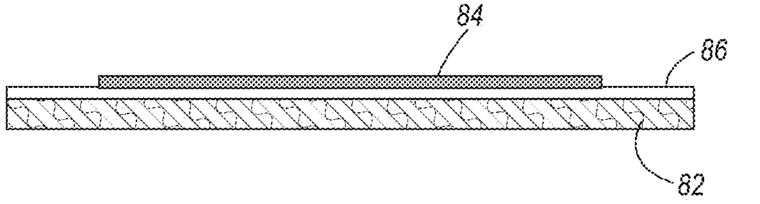
FIG. 6 is an illustration of a further embodiment of substrate including a reflective coating applied thereto.
Figure 7:
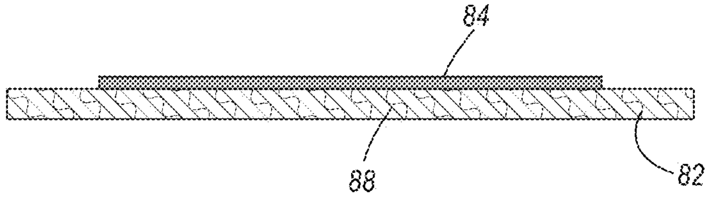
FIG. 7 an illustration of an embodiment of substrate including an integral reflective component.

Referring now to FIGS. 5-7, while the prior described embodiments primarily relate to applying an overcoat to a printed image on a substrate, other configurations are possible. For example, FIG. 5 illustrates an alternative embodiment 80 wherein substrate 82 includes an image 84 to be overcoated, as well as reflective coating 86 disposed on those portions of the substrate and/or or other images that are not to receive an overcoating. That is, for example, in the case where a radiative source emitting wavelengths in the near IR spectrum, IR spectrum, or far IR spectrum, is to be utilized for purposes of heating image 84 to a temperature required to adhere and/or melt and fuse an overcoating powder, prior to applying the overcoating powder, those portions of the substrate or images that are not to receive and melt an overcoating powder can be coated with an IR reflective coating. This serves to reduce the likelihood that such portions are not similarly heated to melt the subsequently applied overcoating powder. This can be important in cases where an image to be overcoated, and an image that is not to be overcoated, may have similar IR absorption properties, e.g., similar colors, similar temperature rise rates, etc., that can cause both to reach similar temperatures upon exposure to a radiative source. Hence, the application of a reflective coating, e.g., an IR coating, that reflects the wavelengths emitted by the radiative source, e.g., an IR emitter, prior to heating and application of an overcoating powder, can be helpful in preventing portions that are not to receive an overcoating from becoming similarly heated and can also be helpful in limiting edge effects (e.g., potential melting of the overcoating powder onto non-image portions at boundaries of the image to be overcoated and the substrate not to be overcoated). In a further embodiment shown in FIG. 6, in the case where substrate 82 may be sensitive to exposure to the radiative source, the substrate can be first coated with coating 86 that reflects electromagnetic radiation emitted from the radiative source, and then an image to be overcoated printed thereon 84. In a further alternative embodiment that is not shown, images that are not to be overcoated may be first printed upon a substrate, a reflective overcoating applied thereover, an image to be overcoated then applied upon the reflective coating, and then such substrate exposed to the radiative source to apply on overcoating upon the image to be overcoated. As shown in FIG. 7, in a further alternative embodiment, substrate 82 can be fabricated to include a reflective component that is an integral component of the substrate itself, and image 84 to be overcoated subsequently applied thereon. Hence, upon exposure to a radiative source, image 84 can become sufficiently heated so to cause an overcoating powder applied thereto to melt, whereas the application of such powder upon the substrate will not cause the powder to similarly melt. This can be advantageous in cases where colored substrates may be utilized and/or the substrate may be sensitive to the radiative source.

Figure 8:
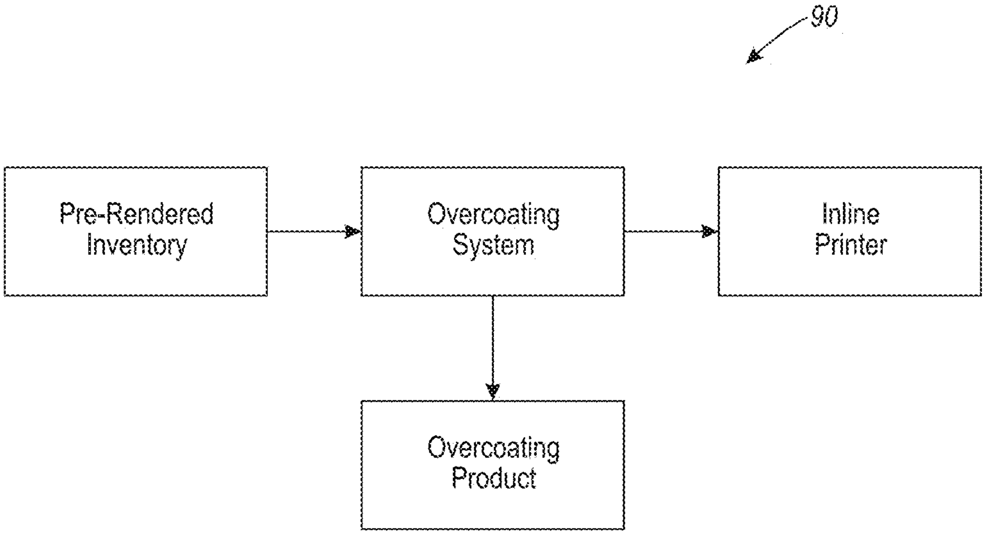
FIG. 8 is a schematic diagram of process flows according to embodiments of a system for overcoating a substrate including a printed image thereon.

Referring now to FIG. 8, the system that applies an overcoat to a printed image on a substrate can be configured to accommodate various production options 90. That is, the system can be configured to comprise a standalone device for receiving pre-rendered or pre-pre-printed stock or substrates in the form of pre-printed individual sheets or pre-printed rolls of stock or substrates, or can be integrated into an in-line type printing machine wherein the image to be overcoated is first printed and then substantially contemporaneously overcoated thereafter. In the case of a stand-alone device, the substrate including the image can be pre-produced and subsequently coated at a point later in time, which can be advantageous. That is, from a productivity perspective, i.e., throughput, it can be desirable to provide an overcoating system that is independent from a printing machine as such a system can provide greater production flexibility and can provide higher uptimes than a system that is integrated with a printing machine in an in-line manner. Notwithstanding, a system according to the instant disclosure can be integrated with a printing machine in an in-line manner.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

The invention claimed is:

1. A method of overcoating a printed image on a printer substrate in the form of an individual sheet or a roll previously printed upon with a laser jet or a xerographic printer, the method comprising:

applying a source of electromagnetic radiation to the printer substrate including the printed image, and with a temperature sensor, measuring temperature rise rates of a portion of the printed image and a portion of the printer substrate not including the printed image;

based on the measured temperature rise rates, calculating an expected time period over which the portion of the printed image and the portion of the printer substrate not including the printed image can be exposed to the source of electromagnetic radiation to cause the portion of the printed image to be heated to a temperature within a predetermined temperature range, without also causing the portion of the printer substrate not including the printed image to be heated to within the predetermined temperature range;

transmitting electromagnetic radiation within a predefined wavelength range to the portion of the printed image and the portion of the printer substrate not including the printed image with a radiative source for a period of time based on the calculated expected time period, such that the electromagnetic radiation is absorbed by the portion of the printed image to heat the portion of the printed image to the predetermined temperature range as measured by the temperature sensor;

depositing an overcoating powder onto the heated portion of the printed image with a depositing device, the overcoating powder having a melting point within the predetermined temperature range such that upon deposition thereof, the overcoating powder adheres and/or melts onto the heated portion of the printed image;

removing any residual overcoating powder not adhered to the portion of the printed image or the portion of the printer substrate not including the printed image with a residual powder removing device.

2. The method of claim 1, further comprising transmitting the electromagnetic radiation to the printed image on the printer substrate for a predetermined time to heat the printed image to the predetermined temperature range, the predetermined time based on one or more of a characteristic of the printer substrate, a characteristic of the printed image, a wavelength range transmitted by the radiative source, an intensity of the electromagnetic radiation transmitted by the radiative source, or a distance between the printer substrate and the radiative source.

3. The method of claim 1, wherein the transmitted electromagnetic radiation has a wavelength from approximately .7 μm to 1 mm.

4. The method of claim 1, wherein the radiative source transmits the electromagnetic radiation to the portion of the printer substrate not including the printed image for the predetermined time, the portion of the substrate not including the image not being heated to within the predetermined range.

5. The method of claim 2, wherein a characteristic of the printed image includes one or more of a color of the printed image and a component of an ink or toner used to apply the image on the printer substrate.

6. The method of claim 5 wherein the component comprises an additive to the ink or toner that is configured to more effectively absorb wavelengths in the range transmitted by the radiative source.

7. The method of claim 2, wherein the radiative source transmits the electromagnetic radiation to the portion of the printer substrate not including the printed image for the predetermined time, the portion of the printer substrate not including the image not being heated to within the predetermined range.

8. The method of claim 2, wherein the printed image comprises a first printed region and a second printed region, wherein the electromagnetic radiation transmitted to the first and second printed regions heats the first printed region to the predetermined range, but does not heat the second printed region to the predetermined range.

9. The method of claim 8, wherein the first printed region comprises a first color and the second printed region comprises a second color, and wherein the first color absorbs the electromagnetic radiation transmitted by the radiative source more effectively as compared to the second color.

10. The method of claim 8, wherein the printer substrate and/or the second printed region is covered by or includes a component that, as compared to the printed region or the first printed region, respectively, reflects the electromagnetic radiation transmitted by the radiative source more effectively.

11. The method of claim 10, wherein the radiative source transmits electromagnetic radiation having a wavelength from approximately .7 μm to 1 mm and the printer substrate and/or the second printed region includes an infrared (IR) reflective component or is covered with an infrared (IR) reflective coating.

12. The method of claim 1, wherein the overcoating powder applied to the portion of the printed image, upon being heated to the predetermined range, melts to form one or more of a clear, glossy, colored, or raised overcoat.

13. The method of claim 1, wherein the overcoating powder applied to the portion of the printed image, upon being heated to the predetermined range, expands in size.

14. The method of claim 1, wherein the printed image comprises a half-tone image.

15. The method of claim 1, wherein the radiative source comprises a full-width radiative source that extends along a width of the printer substrate.

16. The method of claim 1, wherein the depositing device comprises a hopper device that extends along a width of the printer substrate.

17. The method of claim 1, wherein the residual powder removing device extends along a width of the printer substrate and comprises one or more of a sweeping device, an air blowing device, or a vacuum device.

18. The method of claim 1, wherein a system for overcoating the printed image on the printer substrate includes a conveyor assembly that transports the printer substrate including the printed image from the radiation source, to the depositing device, and to the residual powder removing device.

19. The method of claim 1, further comprising a pinning assembly including a heat source that, subsequent to the residual powder removing device removing the any residual overcoating powder not adhered to the portion of the printed image, pins the dry overcoating powder adhered and/or melted onto the portion of the printed image by applying heat to the dry adhered dry overcoating powder.

20. A method of overcoating a dry and fixed printed image on a printer substrate in the form of an individual sheet or a roll previously printed upon with a laser jet or a xerographic printer, the method comprising:

applying a source of electromagnetic radiation to the printer substrate including the dry and fixed printed image and, with a temperature sensor, measuring temperature rises rate of a portion of the dry and fixed printed image and a portion of the printer substrate not including the dry and fixed printed image;

based on the measured temperature rise rates, calculating an expected time period over which the portion of the dry and fixed printed image and the portion of the printer substrate not including the dry and fixed printed image can be exposed to the source of electromagnetic radiation to cause the portion of the dry and fixed printed image to be heated to a temperature within a predetermined temperature range, without also causing the portion of the printer substrate not including the dry and fixed printed image to be heated to within the predetermined temperature range;

transmitting electromagnetic radiation within a predefined wavelength range to the portion of the dry and fixed printed image on the printer substrate image and the portion of the printer substrate not including the dry and fixed printed image with a radiative source for a period of time based on the calculated expected time period, such that the electromagnetic radiation is absorbed by the portion of the dry and fixed printed image to heat the portion of the dry and fixed printed image to the predetermined temperature range as measured by the temperature sensor;

depositing an overcoating powder onto the heated portion of the dry and fixed printed image with a depositing device, the overcoating powder having a melting point within the predetermined temperature range such that upon deposition thereof, the overcoating powder adheres and/or melts onto the heated portion of the dry and fixed printed image; and, removing any residual overcoating powder not adhered to the heated portion of the dry and fixed printed image or the portion of the printer substrate not including the dry and fixed printed image with a residual powder removing device.

* * * * *